United States Patent [19]
Moberg

[11] Patent Number: 6,015,947
[45] Date of Patent: Jan. 18, 2000

[54] METHOD OF TEACHING MUSIC

[76] Inventor: Kathryn L. Moberg, Box 281, Clinton, Minn. 56225

[21] Appl. No.: 09/239,102

[22] Filed: Jan. 28, 1999

Related U.S. Application Data

[60] Provisional application No. 60/073,642, Feb. 4, 1998.
[51] Int. Cl.$^7$ .................................................. G09B 15/02
[52] U.S. Cl. ........................................ 84/471 R; 84/483.2
[58] Field of Search .............................. 84/471 R, 483.1, 84/483.2

[56] References Cited

U.S. PATENT DOCUMENTS

| | | | |
|---|---|---|---|
| 682,015 | 9/1901 | Adams | .................................... 84/483.2 |
| 3,934,357 | 1/1976 | Couvillion . | |
| 4,445,869 | 5/1984 | Wasserman . | |
| 4,496,179 | 1/1985 | Hoffman . | |
| 4,819,539 | 4/1989 | Searing . | |
| 5,254,008 | 10/1993 | Dawson . | |
| 5,597,968 | 1/1997 | Okamoto . | |

Primary Examiner—Bentsu Ro
Assistant Examiner—Shih-yung Hsieh
Attorney, Agent, or Firm—Anthony G. Eggink

[57] ABSTRACT

A method of teaching students to understand, read, and play sheet music. The method includes first teaching students rote understanding of musical notes and progressing to a structural understanding of notes on a musical staff. The teaching method is conducted in a series of five teaching steps and may apply to the teaching of sheet music for any musical instrument or voice instruction. The method is particularly useful for teaching groups of students to read music. The method focuses on building a student's understanding of the scale system of music by teaching the student to play a small portion of notes on a scale through repetition, implementation of a specialized two-line scale, and hand signals. After the student has learned small portions of a scale, the student learns other small sections of the scale until all notes on the musical scale have been learned. The portions are then combined to reinforce the students understanding of the scale as a whole.

13 Claims, 2 Drawing Sheets

STEP 1: Sing three note songs, perform tongue exercises, and use hand signals.

STEP 2: Play by rote three note songs on a recorder, read from two line staff.

STEP 3: Play three note songs reading from five line staff, learn note syllables.

STEP 4: Play three note songs utilizing different note sets, play with rhythm instruments.

STEP 5: Play songs mixing all learned notes.

FIG. 1

METHOD OF TEACHING MUSIC

This application claims the benefit of U.S. Provisional Application No. 60/073,642, filed Feb. 4, 1998.

BACKGROUND OF THE INVENTION

The present invention relates to a method of teaching students to understand, read, and play sheet music. Particularly, the method of the invention relates to teaching students music from rote to note. The method includes the use of novel sheet music. The teaching method comprises the use of specified music and a method of teaching which utilizes that music. More particularly, this invention relates to a music teaching method by first teaching students rote understanding of musical notes and progressing to a structural understanding of notes on a musical staff. The teaching method is conducted in a series of five teaching steps and may apply to the teaching of sheet music for any musical instrument or voice instruction.

Presently, students are typically taught music directly from a five-line musical staff. This method of learning may be lengthy and difficult for students without musical training. The object of this invention is to provide a system of presenting music that is both easy to teach and easy to learn.

SUMMARY OF THE INVENTION

The present invention relates to a method of teaching music that first teaches students to understand musical notes in auditory relation to each other. Once students learn to auditorily distinguish notes, they are then taught to read music visually. The student's auditory understanding of music helps them to master visual reading and playing of music. The method of teaching music from rote to note helps to develop musical skills more quickly and more thoroughly by means of using auditory, visual and vocal elements to understand and play music.

At the outset of the process of this invention, music students are taught to sing songs all comprised of the same three predetermined musical notes such as "Mary Had a Little Lamb" and "Hot Cross Buns." Students sing words, and also the sounds "doo" and "too," to the melody of the song as a method of strengthening the tongue. While singing the three-note-songs, students then add corresponding hand signals to each note.

In the second step, students continue to sing three-note-songs with corresponding hand signals and "doo" and "too" sounds according to Step 1. Students are then taught to play a three-note-song on a recorder by ear (without the use of sheet music). After the students have mastered a three-note-song on the recorder, the notes to the song are drawn on a board or on a handout sheet, for example, having a specialized staff consisting of only two lines. The teacher points to the notes on the board as they correspond to the notes played. At this point, the students can begin to understand how the music they are playing and singing can be visually read and understood. The teacher can now begin to visually teach musical concepts to the students by means of the two line staff.

In the third step, students are introduced to the traditional five line musical staff. They continue to play and sing three-note-songs by reading the notes from this staff and also learn other songs containing predetermined sets of three different notes. Students are taught words to the songs as well as the corresponding syllables (i.e., so la te and mi re do). Students continue to sing with "doo" and "too" as a vocal exercise.

In the fourth step, students continue to play three-note-songs. They are also taught songs containing other three note sets. At this point, rhythm instruments are added while students play or sing to keep them playing or singing together at the same tempo. Students continue to sing the words of the song, the corresponding syllables (i.e., so la te, mi re do, and la so fa), and "doo" and "too" vocal exercises.

In the fifth step, students learn new songs that mix all of the notes. Once songs are learned, rhythmic instruments can be added. Students continue to learn songs and their words and corresponding note syllables (i.e. do re mi fa so la te do). Students also continue "doo" and "too" voice exercises.

The teaching method can be useful for teaching groups of band students to read music wherein these students begin with the three-note-songs and proceed as described above. Students playing instruments that play notes in chords will find this teaching method useful as well. For example, a guitar student may begin by playing a three-note-song according to the teachings of the invention while strumming the cords of the guitar accordingly. The guitar student may first play the first string fret 5, 3, 1, and then play them anywhere else on the guitar in whole steps.

These and other benefits of this invention will become clear from the following description by reference to the drawing.

DESCRIPTION OF THE DRAWINGS

FIG. 1 is a schematic diagram showing the musical teaching steps 1–5 of the teaching method and the present invention;

DESCRIPTION OF THE PREFERRED EMBODIMENTS

This invention relates to a system and method of teaching students to understand, read, and play sheet music. The system of teaching music includes the use of specified music and a method of teaching which utilizes that music. Particularly, this invention relates to a music teaching method by first teaching students rote understanding of musical notes and progressing to a structural understanding of notes on a musical staff.

The method is useful for teaching a single student or groups of students to read music wherein the students begin by learning three-note-songs by rote memory and move on to reading music by note according to the method of the present invention. The method focuses on building a student's understanding of the scale system of musical writing by teaching the student a small portion of the notes on the scale through repetition, implementation of a specialized two-line scale prior to the use of a five-line scale, and hand signals. The method of this invention is set forth in FIG. 1 and is shown comprised of five steps. FIGS. 2–5 show sheet music used in the teaching method of the invention.

FIG. 1 is a schematic diagram that shows steps 1–5 of the teaching method and including the primary tasks taught to music students in each step. As shown in FIG. 1, students in step 1 are taught to sing words to songs comprised of three-notes such as B, A, and G. Such song's include "Mary Had a Little Lamb" and "Hot Cross Buns." Students also sing the sounds "doo" and "too," to the melody of the song as a method of strengthening the tongue. While singing the three-note-songs, students then add corresponding hand signals to each note, for example, a high pitched note receives a high hand motion and a low pitched note receives a low hand motion.

Figure 2:
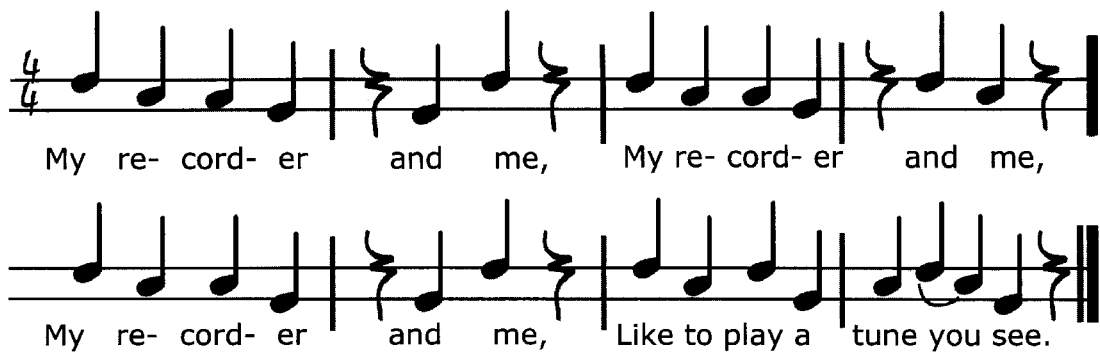
FIG. 2 shows the two line musical staff used for teaching and reading three note songs in step 2 of the music teaching method.

Students in step 2 students may continue to sing the words to B, A, and G three-note-songs, with corresponding hand signals and "doo" and "too" vocal exercises. As shown in FIG. 1, students are then taught to play three-note-songs on a recorder by ear, or rote memory (without the use of sheet music). After the students have mastered a three-note-song on the recorder by rote memory, the notes to the song may be drawn on a board or on a handout having a musical staff consisting of only two lines as shown in FIG. 2. The teacher then points to the notes on the staff as they correspond to the notes played by the students. After the students have played the song while the teacher points to the notes, the teacher may explain musical concepts such as having a top line B, a space A, and a bottom line G. This enables a music teacher to visually show students various musical concepts such as steps, bars, tempo, beats, rests, and note types and patterns. Typically, it is suggested that students be taught one new song per week, however, mastery of each song is important as well.

Figure 3:
FIG. 3 shows the five line musical staff used for teaching and reading three note songs in step 3 of the music teaching method.

As is described in FIG. 1, in step 3 students are introduced to the five line musical staff. They continue to play the same three-note-songs from this staff and also learn songs containing three new notes such as E, D, and C (EDC songs). An example of the five-line musical staff with three-note-songs is shown in FIG. 3. The new three-note-songs may include sharps and flats. Although students have now learned new notes, they continue to play only three-note songs such as BAG or EDC. The old three notes and the new three notes are not usually combined together at this point in the teaching method. Students may continue to sing words to the songs in addition to the corresponding syllables (i.e., so la te and mi re do). Students also sing the sounds "doo" and "too" to the melody of the songs as a form of vocal exercise.

Figure 4:
FIG. 4 shows the five line musical staff used for teaching and reading three note songs in step 4 of the music teaching method.

As is described in FIG. 1, students in step 4 continue to play three-note-songs such as BAG and EDC songs. They are then taught additional three-note-songs, containing notes such as A, G, and F. Now students may play multiple sets of three-note-songs on a five-line music scale, each set pertaining to a distinct musical key. FIG. 4 shows an example of the five-line music scale used in step 4 including a three-note-song comprised of notes different from those illustrated in FIG. 3. At this point, rhythm instruments are added while students play to keep the student(s) singing or playing the songs in tempo. Students may continue to sing the words of the song, the corresponding syllables (i.e., so la te, mi re do, and la so fa), and the sounds "doo" and "too" as vocal exercises.

Figure 5:
FIG. 5 shows the five line musical staff used for teaching and reading songs utilizing combinations of all musical notes in step 5 of the music teaching method.
Figure 5:
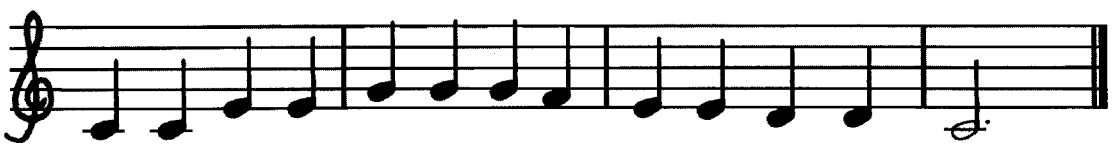

As shown in FIG. 1, students in step 5 learn new songs which combine all of the notes learned. Students are taught to play these songs on a five-line musical scale, an example of which is shown in FIG. 5. Once songs are learned, rhythmic instruments may be used to maintain tempo. Students continue to sing the words of the song, the corresponding syllables (i.e., so la te, mi re do, and la so fa) and the sounds "doo" and "too" as vocal exercises.

In summary, the sheet music is shown in FIGS. 2–5 and the method steps shown in FIG. 1 permits a music teacher to easily and methodically teach students from pre-school age on, to understand, read and play music, to read sheet music and to play musical instruments in accordance with the sheet music.

As many changes are possible to the methods of this invention utilizing the teachings thereof, the descriptions above and the accompanying drawing should be interpreted in the illustrative and not the limited sense.

That which is claimed is:

1. A method of teaching music comprising:
   a) teaching rote understanding of musical skills to the student;
   b) teaching basic structural elements of music to the student by using a two-line staff;
   c) teaching a five-line staff to the student;
   d) teaching rhythm to the student; and
   e) teaching the integration of steps c) and d) to the student.

2. The method of claim 1, wherein step a) is comprised of teaching three-note songs and wherein hand signals are used.

3. The method of claim 1, wherein step b) is comprised of teaching the use of a recorder instrument.

4. The method of claim 1, wherein step c) includes the teaching of musical syllables.

5. The method of claim 1, wherein step d) includes the teaching of using rhythm musical instruments to maintain tempo.

6. A method of teaching music comprising:
   a) teaching students to sing songs comprised of three predetermined notes by rote memory;
   b) teaching students to play songs comprised of said three predetermined notes on an instrument by rote memory and from a two line musical staff;
   c) teaching students to play songs comprised of a second three note set on an instrument from a five-line musical staff;
   d) teaching students to play songs comprised of various three-note-sets on an instrument from a five-line musical staff; and
   e) teaching students to play songs using combinations of all musical notes on an instrument.

7. A method of teaching music comprising:
   a) teaching students to learn, sing, and play music by rote memory;
   b) teaching students to learn, sing, and play music from a two-line musical staff; and
   c) teaching students to learn, sing, and play music from a five line musical staff.

8. The method of claim 7, wherein students are taught voice and tongue strengthening exercises.

9. The method of claim 7, wherein students are taught hand signals which correspond with sung or played notes.

10. The method of claim 7, wherein students are taught the musical syllables corresponding to each note.

11. The method of claim 7, wherein students play to the beat of a rhythmic instrument to maintain tempo.

12. A method of teaching music in the sequence of steps set forth, comprising:
   a) teaching students to sing and learn, by rote, songs all arranged and comprised of the same three predetermined notes, each said note having a predetermined pitch and a predetermined position on a two line and a five line scale;

b) teaching the hierarchy of the pitch of said notes by utilizing hand signals;

c) teaching the hierarchy of scale positions of said notes by utilizing a two line scale;

d) teaching students to read said two line scale by applying said songs to said two line scale and singing from said scale; and e) teaching students to read a five line scale by applying said songs to said five line scale.

13. The method of claim 12, wherein students learn to play musical instruments using said method and wherein said students play said songs on instruments in steps a), d), and e).

* * * * *